United States Patent Office 3,068,281
Patented Dec. 11, 1962

3,068,281
ISOLATION OF THREONINE AND ALLOTHREONINE FROM THEIR MIXTURE
Kiichi Fujii, Ukyo-ku, Kyoto, Mutsuo Oda, Suita-shi, Jun-Ichiro Arita, Moriguchi-shi, and Kango Sakai and Mikio Takeda, Higashiyodogawa-ku, Osaka, Japan, assignors to Tanabe Seiyaku Co., Ltd., Osaka, Japan
No Drawing. Filed May 20, 1959, Ser. No. 814,374
Claims priority, application Japan Oct. 1, 1958
10 Claims. (Cl. 260—534)

This invention relates to a process for isolation of threonine and allothreonine from their mixture. More particularly it relates to a process of purification of threonine containing allothreonine as an impurity.

Threonine is the threo-type stereoisomeric racemate of α-amino- β-hydroxybutyric acid, the other allo-type racemate being known as allothreonine. Methods now available for the preparation of threonine generally result in formaton of a mixture of the two stereoisomeric racemates. Since allothreonine is of no value, separation of DL-threonine must be carried out. This separation is difficult and costly, especially in the case of crude threonine containing a large amount of the allothreonine impurity. In accordance with this invention, we have found that when a mixture of copper chlelate of crude threonine containing the allothreonine impurity is reacted with a lower aliphatic aldehyde, bis(aldehyde)bis(threoninato) copper of high threo-type content is separated from the reaction mixture in which the allothreonine impurity is dissolved. Copper chelate of crude threonine containing the allothreonine impurity may be prepared by the reaction of crude threonine with basic copper carbonate or with a water-soluble copper salt, such as the sulfate or the chloride, in an alkaline solution.

In a preferred mode of operating the invention, a solution of the mixture of copper chelate in water is reacted with a lower aliphatic aldehyde such as acetaldehyde, propionaldehyde and butylaldehyde, to form bis(aldehyde)bis(threoninato) copper and its allo-type isomer.

The resulting bis(aldehyde)bis(threoninato) copper represented by the following formula:

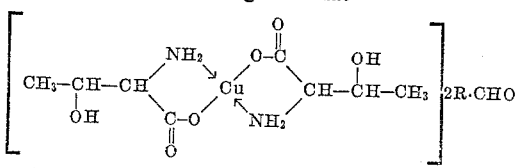

wherein R stands for a lower alkyl group having 1 to 5 carbon atoms, is relatively insoluble in water, while the other corresponding allothreonine compound is soluble in water.

When the reaction mixture is allowed to stand for crystallization and is filtered, purified bis(aldehyde)bis(threoninato) copper is recovered. When the content of allothreonine impurity in the starting mixture is too high to make its isolation from the mixture by a single crystallization possible, it is preferable to recrystallize the resulting compound from dilute methanol.

Free purified threonine may be prepared by removing copper and aldehyde from the purified bis(aldehyde)bis(threoninato) copper. This step is conveniently carried out by bubbling hydrogen sulfide gas into an aqueous suspension of said compound. Then the treated mixture is filtered to remove copper sulfide, and the filtrate is concentrated. When a large amount of absolute methanol is added to this concentrate, purified threonine crystallizes.

This procedure can be conducted either by employing a cation exchange resin alone or in conjunction with said hydrogen sulfide. Thus free threonine is prepared by passing a solution of the purified bis(aldehyde)bis(threoninato) copper in aqueous ammonia through a column of cation exchange resin, such as Amberlite IR-120, which is preliminarily treated with aqueous ammonia, concentrating the passed solution and adding absolute methanol to the solution thus concentrated.

Example 1

10 grams of crude threonine containing 24% of allothreonine are dissolved in 150 cc. of water and 5 grams of basic copper carbonate are added to the solution under stirring. The reaction mixture, which is colored blue, is filtered to remove insoluble matter. 3.8 grams of acetaldehyde are added to the filtrate under stirring and then the mixture is allowed to stand. 11 grams of bis(acetaldehyde)bis(threoninato) copper which contain almost no allothreonine compound are recovered by filtration. The yield of the product thus obtained is 88%, when calculated on the basis of the threonine content in the starting material.

Analysis.—Calculated for $C_{12}H_{24}O_8N_2Cu$: C, 37.13; H, 6.24; N, 7.23; Cu, 16.39. Found: C, 36.87; H, 6.06; N, 7.48; Cu, 16.39.

This product is suspended in 60 cc. of water containing a small amount of acetic acid. In this suspension, hydrogen sulfide gas is bubbled until the blue color of the suspension disappears, forming insoluble copper sulfide. The resulting solution is filtered to remove the precipitate and the filtrate is concentrated to ⅕ of he original volume. To the concentrate, 50 cc. of methanol is added and then crystallized DL-threonine is collected. 5.7 grams of DL-threonine which decompose at 237° C. are obtained after recrystallization from diluted methanol. The product shows 100% DL-threonine upon bio-assay and no allothreonine spot appears on paper chromatography.

Example 2

10 grams of crude theronine containing 24% of allothreonine are dissolved in 400 cc. of water and 5 grams of basic copper carbonate are added to the solution under stirring. The reaction mixture, which is colored blue, is filtered to remove insoluble matter. 6.5 grams of butyraldehyde are added to the filtrate under stirring. 12.9 grams of bis(butyraldehyde)bis(threoninato) copper which contain almost no allothreonine compound are recovered by filtration. The yield of the product thus obtained is 91%, when calculated on the basis of the threonine content in the starting material.

Analysis.—Calculated for $C_{14}H_{32}O_8N_2Cu$: C, 43.26; H, 7.27; N, 6.31; Cu, 14.32. Found: C, 43.20; H, 7.42; N, 6.43; Cu, 14.32.

Removal of copper and butyraldehyde from the product is accomplished in the same manner as described in Example 1. The obtained DL-threonine which decomposes at 237° C. weighted 5.7 grams, and is shown by bioassay to be 100% DL-threonine. No allothreonine spot appears on paper chromatography of the product.

What is claimed is:

1. A process for recovering threonine from admixture thereof with its allotype isomer which comprises introducing into an aqueous medium a mixture of the copper chelate of said threonine with a lower alkyl aldehyde, whereby a reaction takes place forming insoluble bis(aldehyde)bis(threonato) copper chelate, filtering the reaction mass to recover said insoluble bis(aldehyde)bis(threonato) copper chelate, and separating threonine from said chelate.

2. A process according to claim 1 characterized in that the copper chelate is treated with a compound which forms an insoluble copper compound and forming soluble purified threonine, and separating said insoluble compound therefrom.

3. A process according to claim 1 characterized in that the copper chelate is treated with hydrogen sulfide to form an insoluble copper compound and forming soluble purified threonine, and separating said insoluble compound therefrom.

4. A process according to claim 3 characterized in that the addition of hydrogen sulfide is continued until the blue color of the mass disappears.

5. A process according to claim 2 characterized in that said chelate is suspended in aqueous medium for treatment with said compound.

6. A process according to claim 2 characterized in that the solution of threonine is treated with methanol to precipitate the threonine.

7. A process according to claim 2 characterized in that the solution of threonine is concentrated and then is treated with methanol to precipitate the threonine.

8. A process according to claim 1 characterized in that the copper chelate is treated with a cation exchange resin to form an insoluble copper compound and forming soluble purified threonine, and separating said insoluble compound therefrom.

9. A process according to claim 3 characterized in that the threonine solution so formed is passed through a cation exchange resin.

10. A process according to claim 4 characterized in that the copper chelate is dissolved in aqueous ammonia and the solution is passed through said cation exchange resin.

References Cited in the file of this patent

UNITED STATES PATENTS 2,831,763    Nashner _____ Apr. 22, 1958

OTHER REFERENCES

Mukherjie et al.: Journal of the Indian Chemical Society, vol. 32, pp. 581–588 (1955). (Abstracted in Chemical Abstracts, vol. 50, p. 11,973.)

Finar: "Organic Chemistry," vol. 1, p. 390 (1959).

Bailar: "Chemistry of the Coordination Compounds," p. 37 (1956).

Martell et al.: "Chemistry of the Metal Chelate Compounds," p. 26 (1952).